US005951955A

United States Patent [19]
Flieg et al.

[11] Patent Number: 5,951,955
[45] Date of Patent: *Sep. 14, 1999

[54] CONCENTRATION OF SOLIDS IN THE BAYER PROCESS

[75] Inventors: Greg Flieg, Praireville, La.; Robert Cole, Portland, Tex.; Ronald Thomason, Victoria, Tex.; Patrick Bair, Glen Rose, Tex.

[73] Assignee: Cytec Technology Corp., Stamford, Conn.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/744,811

[22] Filed: Nov. 6, 1996

Related U.S. Application Data

[60] Provisional application No. 60/006,300, Nov. 7, 1995.
[51] Int. Cl.⁶ .............................. C22B 21/00; C01F 7/00
[52] U.S. Cl. ...................... 423/121; 423/122; 423/131; 210/734; 210/787
[58] Field of Search ................................. 423/121, 122, 423/131; 210/734, 787; 209/5

[56] References Cited

U.S. PATENT DOCUMENTS

| | | | |
|---|---|---|---|
| 3,345,344 | 10/1967 | Fetscher et al. | 260/78.4 |
| 3,390,959 | 7/1968 | Sibert | 23/143 |
| 3,681,012 | 8/1972 | Sibert | 23/143 |
| 3,975,496 | 8/1976 | Smalley et al. | 423/122 |
| 4,083,925 | 4/1978 | Green et al. | 423/121 |
| 4,480,067 | 10/1984 | Vio et al. | 524/446 |
| 4,532,046 | 7/1985 | Meunier et al. | 210/698 |
| 4,536,296 | 8/1985 | Vio | 252/8.5 C |
| 4,587,306 | 5/1986 | Vio et al. | 525/354 |
| 4,767,540 | 8/1988 | Spitzer et al. | 210/728 |
| 4,902,750 | 2/1990 | Lewellyn et al. | 525/340 |
| 4,994,244 | 2/1991 | Fulford et al. | 423/121 |
| 5,128,420 | 7/1992 | Domb et al. | 525/377 |
| 5,217,620 | 6/1993 | Mahoney et al. | 423/121 |
| 5,539,046 | 7/1996 | Lewellyn | 210/733 |
| 5,601,726 | 2/1997 | Cole | 423/121 |
| 5,607,598 | 3/1997 | Williams | 210/772 |
| 5,665,244 | 9/1997 | Rothenberg et al. | 423/121 |

FOREIGN PATENT DOCUMENTS

| | | |
|---|---|---|
| 0 367 437 | 10/1989 | European Pat. Off. . |
| 0 382 383 | 1/1990 | European Pat. Off. . |
| 0 514 648 | 3/1992 | European Pat. Off. . |
| 924112 | 7/1947 | France . |
| 2236010 | 1/1975 | France . |
| 74018558 | 6/1970 | Japan . |
| 56092116 | 12/1979 | Japan . |
| 2080272 | 7/1980 | United Kingdom . |
| 2112366 | 12/1981 | United Kingdom . |
| 2171127 | 2/1985 | United Kingdom . |

OTHER PUBLICATIONS

Chemical Abstracts, vol. 98, 1983, No. 16, p. 134, 128638e, Abstract Only.

"Advances With Chemical Additives For the Alumina Industry", by TK Hunter et al., Light Metals 1991, Feb. 17, 1991, pp. 159–165.

"New Reagents For Alumina Processing", A.S. Rothenberg et al., Light Metals 1991, pp. 91–96, Feb. 1989.

Development of New Bayer Process Flocculants, by D.P. Spitzer et al., Light Metals 1991, pp. 167–171.

Eisetsu Or, "Dewatering Of Red Mud By A Centrifuge", Kogai Shigen Kenkyusho Ih., vol. 6, Mo. 3, pp. 15–21 (1976).

*An Assessment of Technology for Possible Utilization of Bayer Process Muds* by B. K. Parekh and W.M. Goldberger, U.S. Environmental Protection Agency, Off. Res. Dev., EPA–600/2–76–301 (1976), Dec.

D.E. Sullivan and P.A. Vesiland, *Centrifuge Trade–Offs*, Operations Forum, pp. 24–27 (1986), Oct.

*Ullman's Encyclopedia of Industrial Chemistry*, vol. B2, pp. 11–1 to 11–27, no date.

*International Journal of Mineral Processing* (current affiliation: Gold Fields Laboratories (Pty) Ltd, Johannesburg, South Africa Jour. So. African Inst. of Mining and Metallurgy) "Selective Flocculation of Cassiterite in Mixtures with Quartz Using a Modified Polyacrylamide Flocculant," C.R.A. Clauss, E.A. Appelton* and J.J. Vink, 1976, no month.

Primary Examiner—Steven Bos
Attorney, Agent, or Firm—Pennie & Edmonds LLP

[57] ABSTRACT

Processes for improving solids/liquids separation efficiency in the Bayer process are disclosed, wherein solids are flocculated with hydroxamated polymers and centrifuged.

17 Claims, No Drawings

CONCENTRATION OF SOLIDS IN THE BAYER PROCESS

This application claims benefit of Provisional Appl. No. 60/006,300, filed Nov. 7,1995.

FIELD OF THE INVENTION

The present invention is directed to a process of alumina manufacture via the Bayer process. More particularly, it is concerned with improvements in the Bayer alumina process by the removal of suspended solids by contacting process streams with a polymer which contains hydroxamic acid groups or salts thereof, flocculating said suspended solids, and subjecting the resultant flocculated solids to centrifugation.

BACKGROUND OF THE INVENTION

The almost universally used process for the manufacture of alumina is the Bayer process. In a typical commercial Bayer process, raw bauxite ore is pulverized to a finely divided state. The pulverized ore is then fed to a slurry mixer where a slurry is prepared using water, spent liquor and added caustic. This bauxite slurry is then diluted and sent through a series of digesters where, at about 300°–800° F. and 100–2000 p.s.i., most of the total available alumina is extracted from ore which may contain both trihydrate and monohydrate forms of alumina. The effluent from the digesters passes through a series of flash tanks wherein heat and condensate are recovered as the digested slurry is cooled to about 230° F. and brought to atmospheric pressure. The aluminate liquor leaving the flashing operation (blow-off discharge) contains about 1–20% solids, which consist of the insoluble residues that remain after reaction between the bauxite ore and basic material used to digest the ore and the insoluble products which precipitate during digestion. Herein, all percentages are by weight, based on total weight, unless otherwise stated. The coarser solid particles are generally removed with a "sand trap" cyclone. To separate the finer insoluble solid particles from the liquor, the slurry is normally fed to the center well of a primary mud settler where it is treated with a flocculant such as a polyacrylamide polymer, polyacrylate polymer, hydroxamated polymer, flour and/or starch. As the mud settles, clarified sodium aluminate solution, referred to as "green" or "pregnant" liquor, overflows a weir at the top of the mud settling tank and is passed to the subsequent process steps. The settled solids ("red mud") are withdrawn as underflow from the bottom of the primary mud settler and passed through a countercurrent washing circuit generally comprised of a series of washers, for recovery of sodium aluminate and soda. Aluminate liquor overflowing the primary settler still contains typically 50 to 200 milligrams of suspended solids per liter. This liquor is then generally further clarified by filtration to give a filtrate with less than about 10 milligrams suspended solids per liter of liquor. After passage through the filtration step, the level of suspended solids should be sufficiently low to provide an alumina product from the precipitation step which meets all of the industry standards.

Alumina, in relatively pure form, is then precipitated from the filtrate as alumina trihydrate crystals. The remaining liquid phase or spent liquor is returned to the initial digestion step and employed as a digestant of additional ore after being reconstituted with additional caustic.

The efficient removal of suspended solids from Bayer process streams has been a major problem for many years. The aforementioned insoluble components should be separated at a relatively fast rate to make the overall Bayer process efficient. Ideally, a highly efficient Bayer process would separate the insoluble materials from the aluminate liquor cleanly and completely, to give high solids red mud containing little or no caustic or aluminate liquor, and solubilized alumina liquor with little or no insoluble dispersed residue.

Among the methods of overcoming the above problems and materially speeding up separation of suspended solids from process streams as well as effecting a cleaner separation of the constituents are those disclosed in U.S. Pat. No. 3,390,959 which employs polyacrylates as anionic flocculants and U.S. Pat. No. 3,681,012, which uses combinations of polyacrylates and starch in Bayer alumina recovery circuits. Also of interest in this connection are U.S. Pat. No. 3,975,496 which uses a copolymer of acrylic acid and methylolated acrylamide for the same purpose, and U.K. Patent Specification Nos. 2080272 and 2112366, which use, sequentially, combinations of polyacrylic acid and acrylate-acrylamide copolymers. Other approaches have been proposed: in Japanese Patent Publication No. 56092116 (Jul. 25, 1981) is disclosed starch cationized with a quaternary ammonium salt for use as a coagulant; U.S. Pat. No. 4,083,925 promotes separation from alkali metal aluminate liquor by contacting it with anionic polyacrylamide under special conditions within the mud settler; East German (DE) Pat. No. 2552804 (Aug. 11, 1977) subjects starch to treatment with sodium tetraborate and a magnesium salt to provide improved flocculating properties with lower levels of starch; Russian Pat. No. 507526 (Apr. 6, 1976) reports that cationic flocculants of the formula (R—AR—CH$_2$—N—Ph)$^+$ Cl$^-$ are better for solids flocculation than other known flocculants; Japanese Pat. No. J74018558 (Oct. 5, 1974) discloses using an inorganic calcium compound and sodium polyacrylate for sedimentation and filtration. The use of hydroxamated polymers as flocculants for cassiterite is disclosed in Jour. So. African Inst. of Mining and Metallurgy; Vol. 76; pgs. 117–119 (1975) by Appleton et al. Polymers containing hydroxamic acid groups for reduction of suspended solids in Bayer process streams are described in U.S. Pat. No. 4,767,540, which is hereby incorporated herein by reference. Separation processes such as settling in the presence of a synthetic flocculant, filtering, or centrifugation, wherein the separation must be carried out at a pressure above atmospheric pressure, are described in U.S. Pat. No. 4,994,244.

Because of the rheological characteristics of the solids in most Bayer process streams, including flocculated solids, centrifugation is not typically used to separate solids from the process stream. Instead, separation of the solids is generally accomplished by the use of settlers, decanters, thickeners, classifiers, and filters. With the exception of filters, these devices rely on the gravitational settling of the solids to achieve separation. Flocculation of the solids aids in the settling process by tending to agglomerate smaller particles into larger ones, which tend to settle faster. Flocculation also aids in the filtering process because larger agglomerates are easier to filter than smaller ones, and less likely to plug the filtering means. "Red mud" is generally obtained as the underflow from a settler. It consists mainly of extremely fine, difficult-to-filter, insoluble residue that remains after the caustic-soluble components have been extracted. Typically, the red mud underflow from a primary settler passes through a countercurrent washing circuit, generally comprised of a series of washers, for recovery of sodium aluminate and soda. Current practice is to dispose of the last washer underflow stream and other red mud streams by pumping them as a relatively dilute slurry to holding ponds and lakes constructed for that purpose. The practical limit of such a slurry is 25 to 40 percent solids; 40 percent solids content is usual. Those skilled in the art agree that red mud impoundment is not an ideal solution to the disposal problem. The dikes of mud lakes must be maintained, and there is always the risk of a break and spill of the mud into a nearby stream or waterway. In addition, the large amounts of water going to the impoundment along with the suspended mud may contain caustic and solubilized alumina, which are lost from the process and present a large economic penalty.

Experts have studied the problem of red mud utilization, e.g. "An Assessment of Technology for Possible Utilization of Bayer Process Muds" by B. K. Parekh and W. M. Goldberger, U.S. Environmental Protection Agency, Off. Res. Dev., EPA-600/2-76-301 (1976), which is hereby incorporated herein by reference. Virtually all potential commercial uses of the muds require that the muds be dewatered to the extent that the solids can be transported and/or stored in a consolidated dry form without tendency to leach or pulp. Low-cost dewatering of the muds is therefore considered the key to their possible future utilization. It would be very advantageous to increase the solids content of red mud. High-solids mud could be economically transported to other locations and utilized as an ingredient in e.g. ceramics, cement, construction materials, etc. Such uses might also mitigate the impoundment problem. Centrifugation is a well-known process for achieving solid-liquid separations, but has not been typically used to dewater red mud. It is known to those skilled in the art that centrifugation of red mud is only marginally effective for increasing the solids.

Surprisingly, it has now been discovered that greatly improved dewatering of Bayer process streams, particularly settler underflow and digester blow-off, is obtained by a combination of centrifugation and the use of, as aflocculant, a polymer which contains hydroxamic acid groups. The efficiency of solids/liquids separation in the Bayer process is thus improved by increasing the solids content of the separated solids stream.

The processes of the present invention are designed to increase red mud solids and to recover the dissolved components, such as aluminate and soda, contained therein. The improvement forming the basis of the present invention lies in the centrifugation of suspended solids-containing streams, particularly those containing red mud solids, that have been flocculated using polymers that contain hydroxamic acid groups. Centrifugation of solids that were not flocculated with polymers, or that were flocculated with polymers that did not contain hydroxamic acid groups, has been found to be less effective than current commercial procedures.

DETAILED DESCRIPTION OF THE PREFERRED EMBODIMENTS

According to the present invention, there is provided a process for improving the dewatering of suspended solids, particularly red mud, of the Bayer process whereby a polymer containing hydroxamic acid groups or salts thereof is added to the Bayer process stream in order to effectively remove suspended solids therefrom, and the resulting flocculated solids are dewatered by centrifugation.

The polymer to be employed in the present invention can vary rather broadly in type. It should be sufficiently stable to be effective under the process conditions used, e.g., high temperatures and strong caustic conditions, typically, 185°–225° F., and 80–400 grams per liter total alkali content (expressed as sodium carbonate equivalent).

Thus, for example, any water-soluble hydroxamic acid or salt group-containing polymer may be used in the process of the present invention. The useful polymers can best be exemplified by those containing pendant groups of the Formula (1):

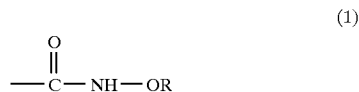

wherein R is hydrogen or a cation. These polymers are well known in the art and can be derived from polymers containing pendant ester, amide, anhydride, nitrile, etc., groups by the reaction thereof with hydroxylamine or its salt, or by polymerization of a monomer which contains a hydroxamic acid or salt group. Hydroxamated polymers derived from polymers containing amide groups e.g. polyacrylamide are preferred.

Exemplary of the polymers which may be hydroxamated for use in the process of the present invention are acrylic, methacrylic, crotonic etc., acid ester polymers such as polymers produced from the polymerization of methyl acrylate, ethyl acrylate, t-butyl acrylate, methyl methacrylate, ethyl methacrylate, cyclohexyl methacrylate, dimethyl aminoethyl methacrylate, dimethyl aminoethyl acrylate, methyl crotonate, etc., polymers of maleic anhydride and esters thereof, and the like; nitrile polymers such as those produced from acrylonitrile etc; amide polymers such as those produced from acrylamide, methacrylamide and the like.

Hydroxamated polymers are well known to those skilled in the art and are specifically disclosed, as are methods for their production, in U.K. Patent Application 2171127 and U.S. Pat. Nos. 3,345,344; 4,480,067, 4,532,046; 4,536,296; 4,587,306; 4,767,540; 4,902,751; and 5,128,420; all of which are hereby incorporated herein by reference. Generally, these hydroxamated polymers may be produced by reacting the polymer containing a pendant reactive group, in solution, with a hydroxylamine or its salt at a temperature ranging from about 10° C. to 100° C., preferably below 500° C., for several hours, and more preferably, at a pH over about 10. From about 1–90% of the available pendant reactive groups of the polymer may be replaced by hydroxamic groups in accordance with said procedures.

In addition to reaction of a hydroxylamine or its salt with a polymer solution, it is known that a polymer latex or emulsion may be reacted directly with a hydroxylamine or its salt. The latex may be, e.g., a copolymer of acrylamide and methyl acrylate or a copolymer of acrylic acid and methyl acrylate. In these cases, the hydroxylamine or its salt reacts primarily with the ester groups to form hydroxamic acid groups.

Also, it is known that aqueous solutions of polymers derived from inverse emulsions and inverse microemulsions (herein referred to also as emulsions and microemulsions) function efficiently in the process of the present invention. These emulsions and microemulsions are made of, for example, aqueous polyacrylamide, or acrylamide/acrylic acid copolymers dispersed in oil and reacted directly with a hydroxylamine or its salt to give very high molecular weight polymers containing hydroxamic acid groups. Dilute aqueous solutions of these polymers, useful in the instant invention, are derived from emulsions and microemulsions by "breaking"; e.g. adding the emulsions and microemulsions to water, optionally adding surfactant, and agitating to dissolve the polymer.

The degree of hydroxamation, i.e., the concentration of Formula 1 units in the polymers useful herein, may range from about 1 to about 90 mole percent, preferably from about 5 to about 75 mole percent and, most preferably, from about 10 to about 50 mole percent. The degree of hydroxamation may be determined by nuclear magnetic resonance spectroscopy techniques well known to those skilled in the art.

Suitable hydroxylamine salts include the sulfates, sulfites, phosphates, perchlorates, hydrochlorides, acetates propionates and the like. The pH of the solution is adjusted to be in the range of about 3 to about 14, preferably over about 7, more preferably over about 10, by means of acid or base addition to the solution.

Any water-soluble polymer may be used in the present process which, after hydroxamation, performs to settle suspended solids. Thus, homopolymers, copolymers, terpolymers, etc. of the above exemplified monomers may be used. Suitable comonomers which, by copolymerization, may form, for example, up to about 95 mole percent of the polymers useful herein can include acrylic acid, sodium acrylate, methacrylic acid, maleic anhydride, vinyl acetate, vinyl pyrrolidone, butadiene, styrene as well as others of the above enumerated esters, amides and/or nitriles and the like as is known in the art and is set forth in the above-incorporated patents as long as such copolymers, terpolymers etc., are water-soluble after hydroxamation. The weight average molecular weight of the polymers useful in the process of the present invention range from about $1 \times 10^4$ to about $1 \times 10^8$, preferably from about $3 \times 10^5$ to about $5 \times 10^7$. Weight average molecular weight may be determined by light scattering techniques well known to those skilled in the art.

The polymers used in the present invention are employed by adding them, usually in the form of a dilute aqueous solution, to any digested bauxite ore process stream containing solubilized alumina and suspended solids dispersed throughout, in an amount at least sufficient to settle said suspended solids. Preferably, the polymers are added to settler underflow streams, washer train underflow streams, and/or digester blow-off streams. The process stream may undergo other chemical treatment e.g. acidification before, during or after the time that the polymer is added. Generally, for best results, at least about 0.1 milligrams (mg) of the hydroxamated polymer is added per liter of process stream.

Mixtures of hydroxamated polymers with other water-soluble polymers e.g polyacrylates, acrylate/amide copolymers, starch, dextran, etc. are effective and may be preferred. For instance, a 1% solution of a polymer containing pendant hydroxamic acid or salt groups could be blended with a 1% solution of polyacrylic acid or its salt and the resultant mixture used to flocculate red mud, or the polymers could be blended while still in the emulsion form. Mixtures of hydroxamated polymers with other chemical agents useful in the Bayer process e.g surfactants may also be effective.

It is understood, that higher amounts than those just stated may be employed without departing from the scope of the invention, although generally a point is reached in which additional amounts of hydroxamated polymer do not improve the separation rate over already achieved maximum rates. Thus, it is uneconomical to use excessive amounts when this point is reached.

The technology of centrifugation is well known to those skilled in the art and a detailed description may be found in e.g Ullman's Encyclopedia of Industrial Chemistry, Volume B2, pp. 11-1 to 11–27, which is hereby incorporated herein by reference Any centrifuge, including filter centrifuges, screen centrifuges, sedimentation centrifuges, decanting centrifuges, etc. may be used in the present invention. Sedimentation and decanting centrifuges are preferred, and classifying decanter centrifuges are most preferred.

The optimization of centrifuge performance is well known in the art e.g. D. E. Sullivan and P. A. Vesiland, "Centrifuge Trade-Offs", Operations Forum, pp. 24–27 (1986), which is hereby incorporated herein by reference. Feed volume depends on the size of the centrifuge and type of centrifuge. For a horizontal classifying decanter centrifuge with a bowl diameter of about 20 inches and a length of about 80 inches, a feed volume of about 4 to about 250 gallons per minute may be used, preferably about 20 to about 100 gallons per minute, most preferably about 30 to about 90 gallons per minute. Feed solids may range from about 0.01% to about 45%, preferably from about 15% to about 30%. The G-force is generally in the range of about 500 to about 3000×G, preferably in the range of about 1000 to about 1500×G. The differential between the scroll and the bowl is generally less than 150 revolutions per minute (rpm), preferably from about 1 to about 100 rpm, more preferably from about 10 to about 50 rpm, most preferably from about 30 to about 40 rpm.

Water-soluble polymers containing pendant hydroxamic acid or salt groups may be mixed with the Bayer process stream, preferably the settler underflow or digester blow-off, in a holding tank prior to being introduced to the centrifuge, or pumped into the process stream feed line, or added via a feed tube directly inside the centrifuge. Preferably, the polymer is added in the form of a dilute solution, e.g. from about 0.01% to about 3%, directly inside the centrifuge. Those skilled in the art recognize that the optimum polymer concentration in the dilute solution depends on the solids level in the Bayer process stream, and can be ascertained by routine experimentation.

When hydroxamated polymers are used, preferably within the ranges specified above, to flocculate suspended Bayer process solids, preferably settler underflow, settler overflow, washer train underflow, washer train overflow, or digester blow-off streams, the flocculated solids are centrifuged to produce centrifuged solids (cake) and aqueous liquid (centrate). Preferably, the operation of the centrifuge is optimized according to principles well known in the art. The settler underflow streams are preferably primary settler underflow streams. The washer train underflow streams may be streams from any washer in the washer train, preferably the last washer underflow stream. The cake solids (the weight percent water-insoluble material) of the cake, or centrifuged solids, is higher than the feed solids, preferably greater than about 40%, more preferably greater than about 50%, most preferably greater than about 60%. Although is it generally preferred for the cake solids to be as high as possible, plugging of the centrifuge may occur at very high solids levels e.g. 90%. For obvious reasons plugging of the centrifuge is to be avoided. In practice, the desired solids level is generally dependent on whatever handling characteristics are desired in the centrifuged solids. The processes of the instant invention are particularly useful for concentrating, or dewatering, red mud, typically from settler underflow streams, and/or blow-off discharge.

It is generally desirable for the centrate, which is comprised of the aqueous liquid, or aluminate liquor, to be as clear as possible; i.e., to have as low a concentration of suspended solids as possible to avoid contamination of the final product. The solids level (the weight percent water-insoluble material) in the aqueous liquid is less than the feed solids, preferably 1% or less, more preferably 0.5% or less, even more preferably 0.2% or less, and most preferably 0.1% or less. The solids level in the centrate is frequently expressed as the centrate clarity, as specified in the examples.

In practical terms, the centrifugation of flocculated solids to achieve both highly dewatered red mud and clear aqueous liquor is most often optimized in the context of other plant operations. For instance, the degree of red mud dewatering and the clarity of the aqueous liquor may be adjusted up or down to achieve other desirable outcomes such as lower power consumption, reduced waste disposal costs, increased rates of production, increased product purity, reduced consumption of raw materials, etc. Flocculation and centrifugation may be used in place of, or in addition to, or in combination with, the usual means of solids/liquids separation employed in the Bayer process e.g settlers, decanters, thickeners, classifiers, and filters. For instance, the use of settlers may be reduced or avoided by flocculating and centrifuging blow-off discharge directly. A consecutive or intermittent series of centrifuges may also be employed, with the output of one as the input for another.

The following examples are set forth for illustration purposes only and are not to be construed as limits on the present invention.

In the following Examples, the solids content (cake solids) of centrifuged solids is determined by weighing a sample of centrifuged solids, washing the solids with deionized water, and drying the sample to constant weight in a forced air oven maintained at about 105° C. The cake solids are expressed in wt. % as (dried weight/initial weight)×100. Centrate (aqueous liquor) clarity, or wt % water-insoluble material in the aqueous liquid, is determined by weighing a centrate sample, filtering the centrate through a previously weighed 45 micron polypropylene or glass filter, washing the solids with water, and drying the filter to constant weight in a forced air oven maintained at about 105° C. Values for centrate clarity are expressed in wt. % as [(dried filter weight-initial filter weight)/(centrate weight)]×100.

Polymer D is obtained commercially; it contains about 90 mole % ammonium acrylate and about 10 mole % acrylamide and has a molecular weight of about 15,000,000.

EXAMPLE A

Polymer A is prepared as follows: 100 Parts of 18% aqueous solution of polyacrylamide (molecular weight of about 500,000) is combined with 3 parts of sodium thiosulfate stabilizer, 54 parts of 30% aqueous hydroxylamine sulfate, and 35 parts 50% aqueous sodium hydroxide in a suitable vessel. The mixture is stirred at a temperature of about 30–40° C. for two hours, then allowed to cool to ambient temperature. After two days, the degree of hydroxamation of the polymer in the resulting 12.5% solution is found to be about 60 mole %.

EXAMPLE B

Polymer B is prepared as follows: 65 Parts of 30% aqueous hydroxylamine sulfate, 25 parts of sodium thiosulfate stabilizer, 142 parts water and 160 parts 50% aqueous sodium hydroxide are mixed in a suitable vessel to give a solution This solution is added to a mixture of 141 parts aliphatic oil, 1 part of an ethoxylated amine surfactant, and 438 parts of a polyacrylamide microdispersion having a molecular weight of about 15,000,000 and containing 25% polymer solids, with the temperature being maintained below about 35° C. for about 24 hours or more. The resulting hydroxamated polymer microdispersion contains about 11% polymer solids and the degree of hydroxamation is about 14 mole %.

EXAMPLE C

Polymer C is prepared as follows: 70 parts of a 1% solution of a polymer prepared as in Example B is blended with 30 parts of a 1% polymer solution of a commercially available sodium polyacrylate having a molecular weight of about 10,000,000.

EXAMPLES 1–12

The Bayer process stream used in these examples is underflow from a red mud settler. The underflow slurry is fed with a variable speed pump to a horizontal classifying decanter centrifuge having a bowl diameter of about 20 inches and a length of about 80 inches. The G force is between about 1000×G and about 1600×G. The differential speed is about 15 to about 35 revolutions per minute (rpm). The polymer, as a ~0.5% solution, is fed directly into the feed chamber of the centrifuge via a feed tube. The dosage of the polymer. in units of grams of real polymer per dry ton (g/DT) of centrifuged solids, is shown in Table 1. Centrifugation of red mud without the use of polymer gives an unacceptably cloudy filtrate. Table 1 also shows the identity of the polymers used, prepared as in Examples A, B and C, the wt. % solids of the red mud slurry, the feed rate of the red mud slurry (in units of gallons per minute, gpm), the cake solids (wt. % solids in the centrifuged red mud solids) and the centrate clarity (wt. % filterable solids in the aqueous liquor). The results demonstrate that the hydroxamated polymers provide high centrifuge cake solids and clear centrate.

TABLE 1

| Example No. | Red Mud Slurry Solids, Wt % | Red Mud Slurry Feed Rate, gpm | Polymer Flocculant | Polymer Dosage, g/DT | Cake solids, Wt % | Centrate Clarity, Wt % |
| --- | --- | --- | --- | --- | --- | --- |
| 1 | 20.1 | 50 | Polymer B | 243 | 71.4 | 0.4 |
| 2 | 21.3 | 55 | Polymer B | 249 | 66.1 | 0.055 |
| 3C | 21.3 | 55 | Polymer D | 741 | Very Poor | Very Poor |
| 4 | 16.3 | 84 | Polymer B | 663 | 60.3 | 0.09 |
| 5 | 21.4 | 55 | Polymer B | 275 | 63.7 | 0.09 |
| 6 | 15.5 | 55 | Polymer C | 412 | 63.7 | 0.16 |
| 7 | 18.9 | 55 | Polymer C | 260 | 63.6 | 0.1 |
| 8 | 18.9 | 55 | Polymer A | 1156 | 65.2 | nd |
| 9 | 18.9 | 55 | Polymer C | 301 | 63.2 | 0.07 |
| 10 | 20.3 | 55 | Polymer B | 218 | 63 | 0.1 |
| 11 | 20.3 | 55 | Polymer B | 172 | 64.2 | nd |
| 12 | 20.3 | 55 | Polymer B | 224 | 63.4 | nd |

C = Comparative
nd = not determined

EXAMPLES 13–15

The Bayer process stream used in these Examples is primary settler overflow having a feed solids of about 0.015%. The conditions used are the same as in Examples 1–12, with appropriate adjustment for the lower solids content of the slurry. Using polymers prepared as in Examples A, B, and C, values of cake solids are obtained that are substantially equivalent to those in Table 1; values of centrate clarity less than 0.015% are obtained.

EXAMPLES 16–18

The Bayer process stream used in these Examples is last washer underflow having a feed solids of about 30%. The conditions used are the same as in Examples 1–12, with appropriate adjustment for the higher solids content of the slurry. Using polymers prepared as in Examples A, B, and C, values of cake solids and centrate clarity are obtained that are substantially equivalent to those in Table 1.

EXAMPLES 19–25

The red mud slurry used in these Examples is blow-off discharge. The feed solids of the slurry is about 2% and the feed rate of the slurry is shown in Table 2 The slurry is fed with a variable speed pump to a horizontal classifying decanter centrifuge having a bowl diameter of about 20 inches and a length of about 80 inches. The G force is about $1200 \times G$. The differential speed is about 10 rpm. Polymers A and B are obtained as above, diluted to 1% solution, and fed directly into the feed chamber of the centrifuge via a feed tube. The dosage of the polymer is as shown in Table 2. The centrate clarity both with and without polymer is shown in Table 2.

TABLE 2

| Example No. | Slurry Feed rate, gpm | Polymer Flocculant | Polymer Dose, g/DT | Centrate Clarity, wt % |
|---|---|---|---|---|
| 19 | 50 | Polymer A | 150 | 0.37% |
| 20 | 50 | Polymer A | 300 | 0.31% |
| 21 | 50 | Polymer A | 375 | 0.31% |
| 22 | 50 | Polymer B | 131 | 0.23% |
| 23C | 50 | None | N/A | 0.42% |
| 24 | 42 | Polymer B | 150 | 0.05% |
| 25C | 42 | None | N/A | 0.38% |

C = Comparative
N/A = Not Applicable

We claim:

1. A process for increasing solids/liquids separation efficiency in Bayer alumina process streams by centrifugation, the process comprising contacting and efficiently mixing at least a portion of a Bayer process stream which comprises suspended solids and an aqueous solution with a water-soluble polymer containing pendant hydroxamic acid or salt groups in an amount effective to flocculate the suspended solids therein, said polymer having a molecular weight ranging from about $1 \times 10^4$ to about $1 \times 10^8$, and centrifuging the polymer-containing Bayer process stream portion under conditions sufficient to concentrate the flocculated solids to produce a red mud of centrifuged solids having a solids content greater than 50 percent by weight, thereby separating the centrifuged solids from the aqueous solution.

2. The process as claimed in claim 1, wherein said Bayer process stream is blow-off discharge.

3. The process as claimed in claim 1, further comprising forming said polymer by reacting a polymer latex or emulsion with hydroxylamine or a hydroxylamine salt.

4. The process as claimed in claim 1, further comprising centrifuging the flocculated solids with a decanting centrifuge.

5. The process as claimed in claim 1, wherein said centrifuged solids have a solids content of 60% or greater, by weight based on total weight.

6. The process as claimed in claim 1, wherein said centrifuged solids have a solids content of 70% or greater, by weight based on total weight.

7. The process as claimed in claim 1, wherein said solution contains less than 1% solids, by weight based on total weight.

8. The process as claimed in claim 1, wherein said solution contains less than 0.5% solids, by weight based on total weight.

9. The process as claimed in claim 1, wherein said solution contains less than 0.2% solids by weight based on total weight.

10. The process as claimed in claim 1, wherein said polymer is an acrylamide polymer containing pendant hydroxamic acid or salt groups.

11. The process as claimed in claim 1, wherein said polymer has molecular weight ranging from about $3 \times 10^5$ to about $5 \times 10^7$.

12. The process as claimed in claim 1, wherein the degree of hydroxamation of said polymer ranges from about 1 to about 90 mole percent.

13. The process as claimed in claim 1, wherein the degree of hydroxamation of said polymer ranges from about 5 to about 75 mole percent.

14. The process as claimed in claim 1, wherein said process stream is a settler underflow stream.

15. The process as claimed in claim 14, wherein said settler underflow stream is a primary settler underflow stream.

16. The process as claimed in claim 1, wherein said process stream is a settler overflow stream.

17. The process as claimed in claim 1, wherein said process stream is a last washer underflow stream.

* * * * *